United States Patent
Evfimiou et al.

(10) Patent No.: US 10,157,377 B2
(45) Date of Patent: Dec. 18, 2018

(54) SYSTEM AND METHOD FOR RESERVATION INVENTORY MANAGEMENT

(71) Applicant: Versonix Corporation, San Jose, CA (US)

(72) Inventors: Vadim Evfimiou, San Jose, CA (US); Pavlo Fomenko, San Jose, CA (US)

(73) Assignee: VERSONIX CORPORATION, San Jose, CA (US)

( * ) Notice: Subject to any disclaimer, the term of this patent is extended or adjusted under 35 U.S.C. 154(b) by 105 days.

(21) Appl. No.: 13/938,084

(22) Filed: Jul. 9, 2013

(65) Prior Publication Data

US 2015/0019357 A1   Jan. 15, 2015

(51) Int. Cl.
| | |
|---|---|
| *G06Q 20/20* | (2012.01) |
| *G06Q 10/02* | (2012.01) |
| *G06Q 10/08* | (2012.01) |
| *G06Q 30/02* | (2012.01) |

(52) U.S. Cl.
CPC .......... *G06Q 20/203* (2013.01); *G06Q 10/02* (2013.01); *G06Q 10/087* (2013.01); *G06Q 30/02* (2013.01)

(58) Field of Classification Search
CPC .... G06Q 10/087; G06Q 10/02; G06Q 20/203; G06Q 10/06; G06Q 20/202; G06T 1/20; H04L 12/42; H04L 12/40071; H04L 12/437; H04L 12/4637; G06F 15/8015; G06F 13/38; G06F 13/00; H04J 3/1617; H04J 3/085
USPC .......................... 705/5, 22, 28, 7.25; 709/218
See application file for complete search history.

(56) References Cited

U.S. PATENT DOCUMENTS

| | | | |
|---|---|---|---|
| 5,237,496 A | 8/1993 | Kagami et al. | |
| 5,732,398 A | 3/1998 | Tagawa | |
| 6,029,191 A * | 2/2000 | Kurashima | G06F 9/544 709/204 |
| 6,253,187 B1 * | 6/2001 | Fox | 705/7.35 |
| 6,963,847 B1 | 11/2005 | Kennedy et al. | |

(Continued)

FOREIGN PATENT DOCUMENTS

| | | |
|---|---|---|
| JP | 2009067552 A2 | 4/2009 |
| WO | 0241210 A1 | 5/2002 |

OTHER PUBLICATIONS

Kingsley, I., et al. "Travel Information Kiosks: An Emerging Communications Channel for the Tourism Industry." Journal of Travel & Tourism Marketing, vol. 4(1). The Hartworth Press, 1995.
(Continued)

*Primary Examiner* — Florian M Zeender
*Assistant Examiner* — Milena Racic
(74) *Attorney, Agent, or Firm* — Dergosits & Noah LLP

(57) ABSTRACT

A system and method for automatically managing the allocation of reservation inventory for an individual POS terminal in a distributed reservation system having multiple POS terminals. Inventory allocation for an event for the individual POS terminal is calculated as a function of total reservation capacity for the event, the allocation and use of reservation inventory at the individual POS terminal, and/or the allocation and use of reservation inventory at other POS terminals in the reservation system. All POS terminals in the reservation system periodically share a token with one another to get updated inventory status for use in calculating inventory allocations.

10 Claims, 4 Drawing Sheets

(56) References Cited

U.S. PATENT DOCUMENTS

| | | |
|---|---|---|
| 6,996,538 B2 | 2/2006 | Lucas |
| 7,532,634 B2 * | 5/2009 | Higashitaniguchi ........................ H04L 12/437 370/404 |
| 7,658,323 B2 | 2/2010 | Kleinman et al. |
| 7,801,778 B2 | 9/2010 | Fox |
| 7,912,754 B2 | 3/2011 | Tirinato et al. |
| 8,090,604 B2 * | 1/2012 | Fitzgerald et al. ............... 705/5 |
| 8,347,088 B2 | 1/2013 | Moore |
| 8,364,507 B2 | 1/2013 | Norrid |
| 2002/0165782 A1 | 11/2002 | Falkenstein et al. |
| 2003/0128699 A1 * | 7/2003 | Reams .................. H04L 1/1832 370/389 |
| 2004/0054577 A1 | 3/2004 | Inoue et al. |
| 2007/0136140 A1 | 6/2007 | Smith |
| 2009/0030743 A1 | 1/2009 | Tussy |
| 2009/0171736 A1 | 7/2009 | Segler et al. |
| 2010/0106609 A1 | 4/2010 | Sherman et al. |
| 2010/0169130 A1 * | 7/2010 | Fineman ................ G06Q 30/06 705/5 |
| 2011/0196754 A1 * | 8/2011 | Proud et al. .................... 705/16 |
| 2012/0047298 A1 * | 2/2012 | Inoue .................. G06F 13/4256 710/107 |
| 2012/0296679 A1 | 11/2012 | Im |

OTHER PUBLICATIONS

Terdoslavich, W. (1998). "Novera debuts application server." Computer Reseller News, No. 786.

Yeung, C., et al. (Jan. 1998). "A multi-agent based tourism kiosk on internet." System Sciences, 1998, Proceedings the of Thirty-First Hawaii International Conference, vol. 4, pp. 452-461.

Laudon, K. et al. (2008) "E-commerce." http://www.cpe.ku.ac.th/~mcs/courses/2008_01/214571/slides.Laudon_Traver_E-commerce4E_Chapter09.pdf.

International Search Report dated Mar. 10, 2015 in corresponding PCT Application No. PCT/US14/45680.

Written Opinion dated Mar. 10, 2015 in corresponding PCT Application No. PCT/US14/45680.

* cited by examiner

SYSTEM AND METHOD FOR RESERVATION INVENTORY MANAGEMENT

TECHNICAL FIELD

This disclosure relates generally to the field of computer-based reservation systems for travel, lodging and transportation, and more specifically, to a reservation system providing a method for managing reservation inventory.

BACKGROUND

Computer-based reservation systems for travel and transportation are generally known, such as Seaware reservation software, sold by Versonix Corporation, of San Jose, California. Such systems can provide automated solutions for management of reservation inventories for all modes of travel, lodging and transportation, such as airlines, trains, cruise lines, ferries, resorts, cargo shipping, etc. However, such reservation systems are typically configured with remote point-of-sale terminals that rely on a central server to confirm reservation requests and update reservation inventory. While the central server may be located at one of the point-of-sale locations, e.g., at the destination airport, if the connection to the central server is lost for any reason, the ability to book new reservations is interrupted at least at other locations, and therefore only limited functionality is provided at the other point-of-sale locations while connection to the central host is down, such as checking in or issuing tickets on pre-existing reservations. Further, when the remote terminals do reconnect with the central host, some period of time is necessary to resynchronize reservation and inventory data to all POS terminals.

It would therefore be desirable to have a computer-based reservation system that enabled each remote POS terminal to act on its own to actively accept new reservations, and did not rely upon a central server in order to confirm reservation requests and update reservation inventory.

DETAILED DESCRIPTION

A system and method is described for automatically managing the allocation of event reservation inventory at each point-of-sale location in a distributed reservation system having multiple point-of-sale locations. An inventory allocation for each event is calculated for a particular POS device as a function of one or more of: (i) the total reservation capacity for the event, (ii) the allocation and use of reservation inventory at the particular POS device, and (iii) the allocation and use of reservation inventory at other POS devices in the reservation system. Advantageously, all POS devices in the reservation system communicate an updated inventory status periodically to one another by token via a communications bus. However, even when communication of status between the POS devices fails, each POS device will continue to manage and sell its active inventory in accord with its programmed instructions using the most recent inventory status data.

Figure 1:
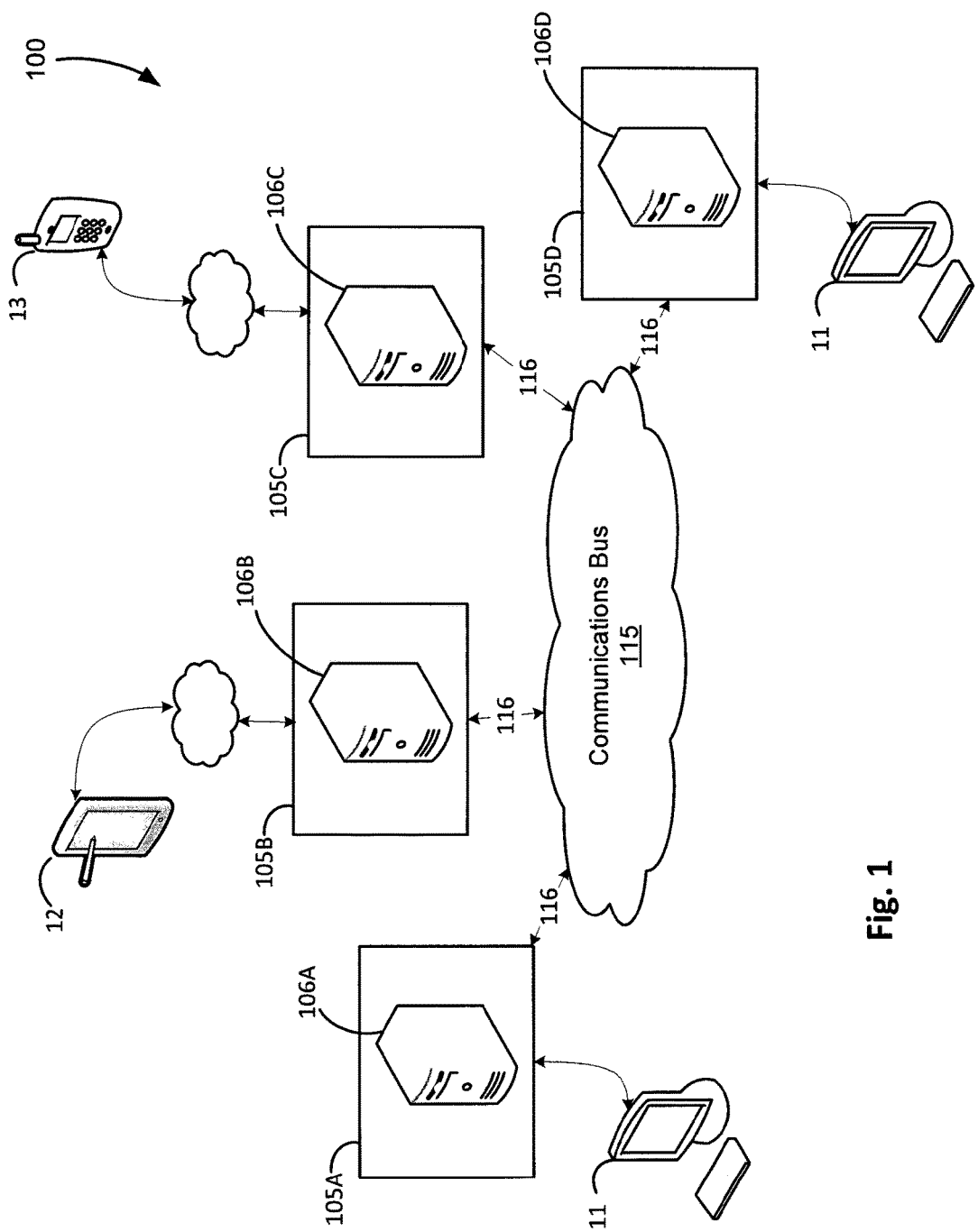
FIG. 1 is a block diagram of a distributed computer-based reservation system.

Referring to FIG. 1, an embodiment of a distributed computer-based reservation system 100 is illustrated. In one example, reservation system 100 may be used for airline reservations, with multiple POS terminals 105 at distributed locations, including, for example, POS terminal 105A located at airport#1, POS terminal 105B located at airport#2, POS terminal 105C located at airport#3, POS terminal 105D located at airport#4, and so forth.

Each POS terminal 105 is configured as a stand-alone, processor-based computing device, e.g., a server 106 having a connected user's terminal 11 and programmed to have full functionality for the purchase of tickets and/or reservations for any of the airlines and/or locations within its current inventory, as described herein. Each POS terminal 105 may also be configured for network access by other terminal devices or user devices, such as tablet 12 and/or smartphone 13, for example, as part of a local Wi-Fi network, local area network, or any known network scheme.

Each POS terminal 105 is connected to a communications bus 115 by a communications link 116. In one embodiment, the communications link 116 and communications bus 115 are implemented as part of a standard TCP/IP model ("Transmission Control Protocol/Internet Protocol"). For example, the communications bus 115 may be the Internet, or any other wide area network, and the communications link 116 may be implemented as part of a communications program installed and executing on the POS terminal 105. In key part, the communications program configures a transport layer, a network layer, and a network interface layer, in accord with the Open Systems Interconnection ("OSI") reference model as is well-known in the art, for sending and receiving data packets over a network. The transport layer constructs the data packet(s) for delivery to a network layer. The network layer completes addressing of the packet(s) and delivers the packet(s) to a network interface layer. The network interface layer performs the physical interface for the POS terminal 105 to finally send the packets onto the communications bus 115. Operating the POS terminals to communicate with each other in accord with these standard protocols allows for simple implementation and effective communication of inventory status updates among the POS terminals via the communications bus 115 in system 100.

Figure 2:
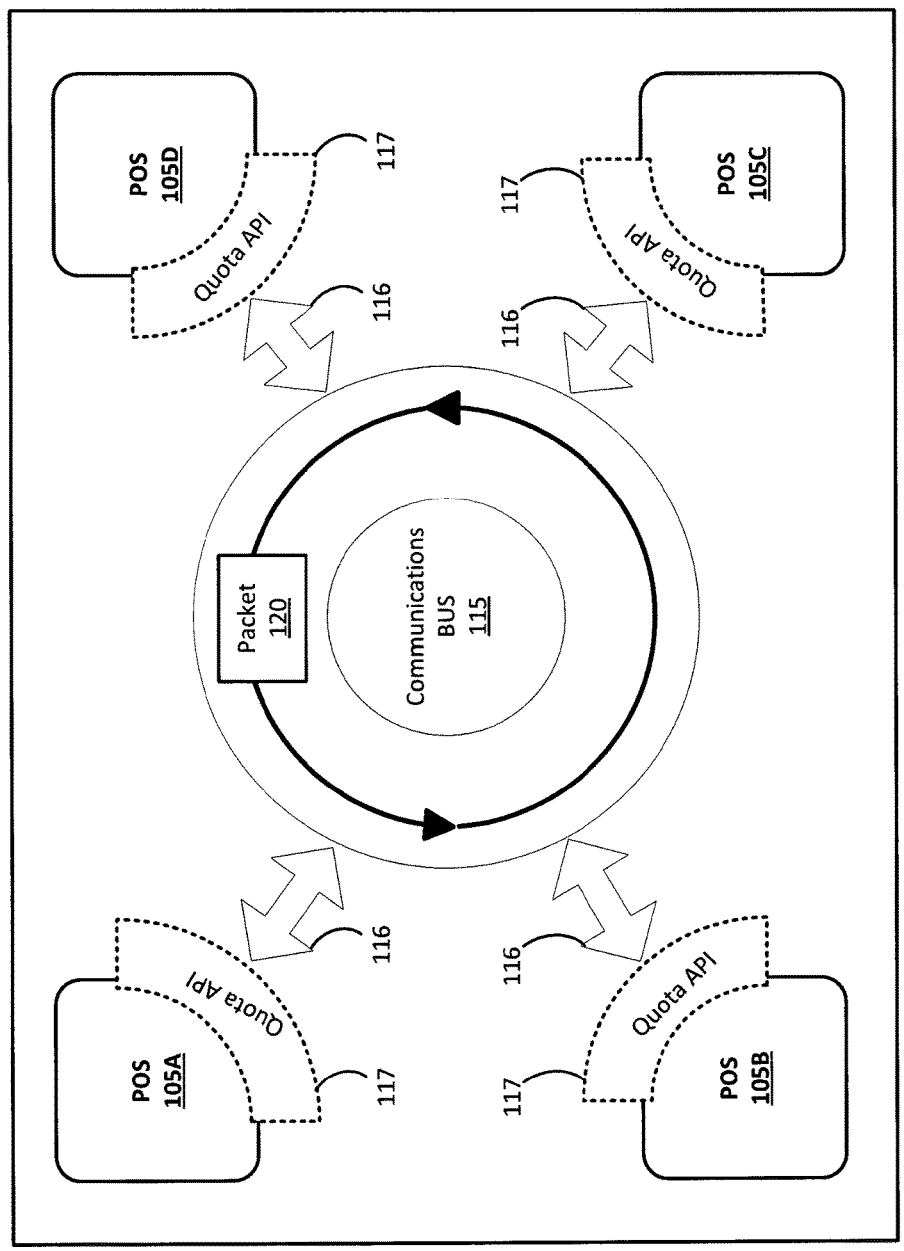
FIG. 2 is a block diagram illustrating communications between the distributed POS terminals shown in the reservation system of FIG. 1.

The distributed reservation system 100 is a peer-to-peer type network system, with each of the POS terminals 105 having the same role within the system, and communications are carried out from one POS terminal to the next, without the assistance or interference of a central computer. For example, communications among the POS terminals 105 using the communications bus 115 is carried out in a ring-type topology with standard TCP/IP packet protocols, as illustrated schematically in FIG. 2. Thus, the POS terminals 105 use the communications bus 115 to periodically circulate a "token" in the form of a data packet 120 in a defined order, for example, in series from server 106A, to server 106B, to server 106C, to server 106D, and thus the POS terminals and communications bus act like a token ring network. At each server in the ring, a bus manager for the communications bus 115 drops off data from the other servers, and picks up data from this server, the data related to current usage and quotas. Further, at each server in the ring, an application programming interface ("API") 117 is configured to facilitate the exchange of status information between the various POS terminals.

Redirecting the token to the next POS terminal is readily accomplished by modifying the source and destination addresses in the header of the data packet, and during each bus cycle, each POS terminal updates the packet to identify itself as the source address and the next POS terminal in the ring as the destination address. Of course, inventory status is updated as well during each cycle, as will now be described. In this way, the circulation of tokens may be appropriately limited to the known addresses of the POS terminals in the defined network.

Figure 3:
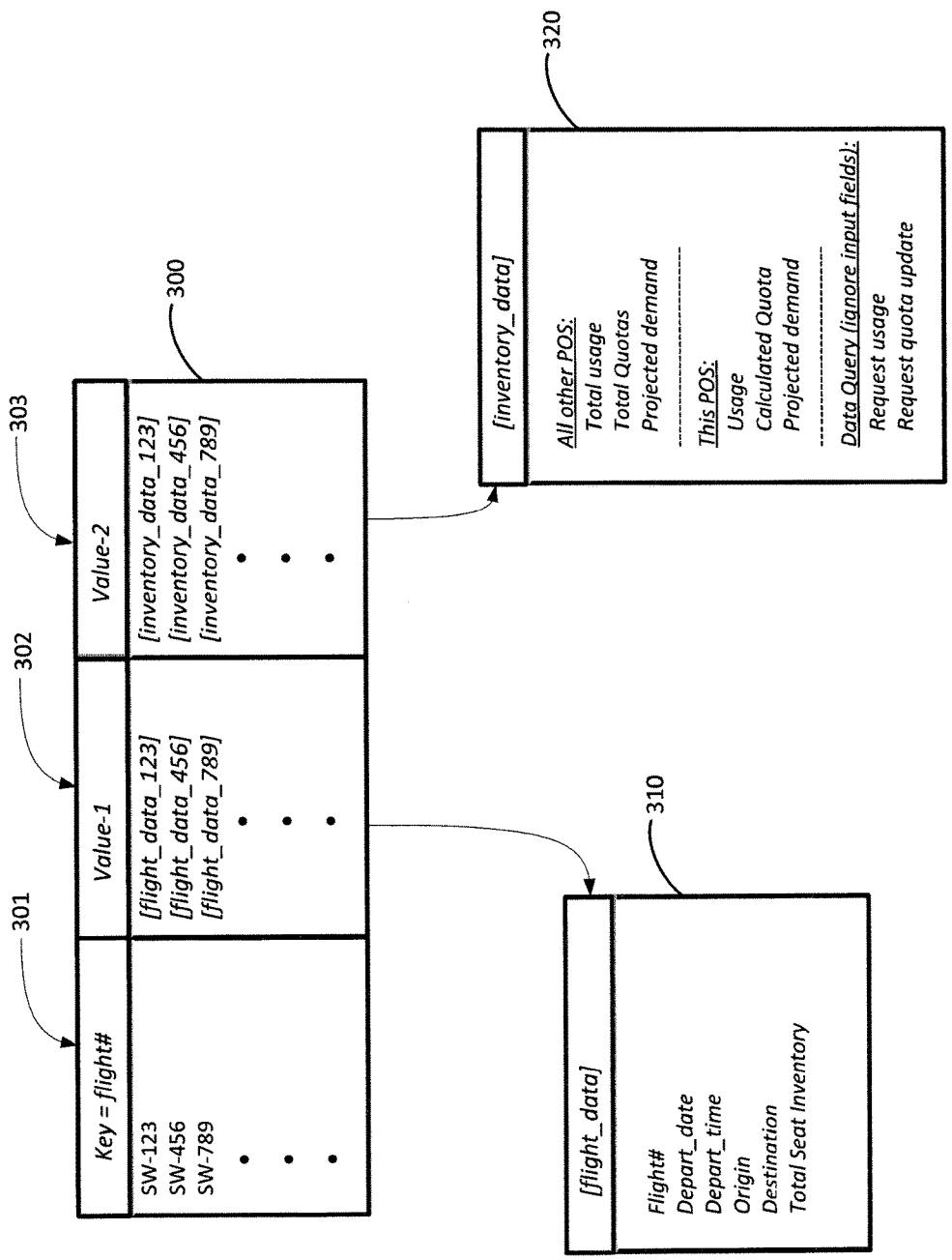
FIG. 3 is a block diagram illustrating a data structure for storing data records.

A token may be populated from data records stored in each POS terminal. For example, as shown in FIG. 3, an associative array such as hash table 300 may be used to store and associate inventory specific values with critical keys. Thus, the hash table 300 may be used for storing flight schedules and related data, with a primary key being the flight_number as shown in column 301, a first associated set of values stored or linked with the flight_number in column 302, and a second associated set of values stored or linked with the flight_number in column 303.

The first associated set of values may be relevant flight data, which can be stored as a separate record 310 linked to table 300 as shown in FIG. 3, or alternatively, as an explicit list stored with column 302 of table 300. For example, relevant flight data for each flight may include flight number, departure date, departure time, origin airport, destination airport, etc., as well as the total seat capacity.

The second associated set of values may be dynamic inventory_data, which can also be stored as an explicit list with column 303 of table 300, but is preferably stored as a separate record 320 linked to table 300 as shown in FIG. 3. In this way, inventory status updates may be obtained by direct reference to the appropriate data record such as record 320.

For the purpose of process 400 as described herein, relevant inventory data includes inventory status data obtained from other POS terminals via the token, and current inventory status data for this POS terminal. For example, status data for other POS terminals includes reservations sold (usage), current inventory quotas, and projected demand for reservations, and is only updated in record 320 when the token is received at this POS terminal. Status data for this POS terminal also includes reservations sold (usage), inventory quotas and projected demand, but these values can be updated and/or recalculated periodically and/or as needed by this POS terminal regardless of whether updates from other POS terminals are received via the token.

Figure 4:
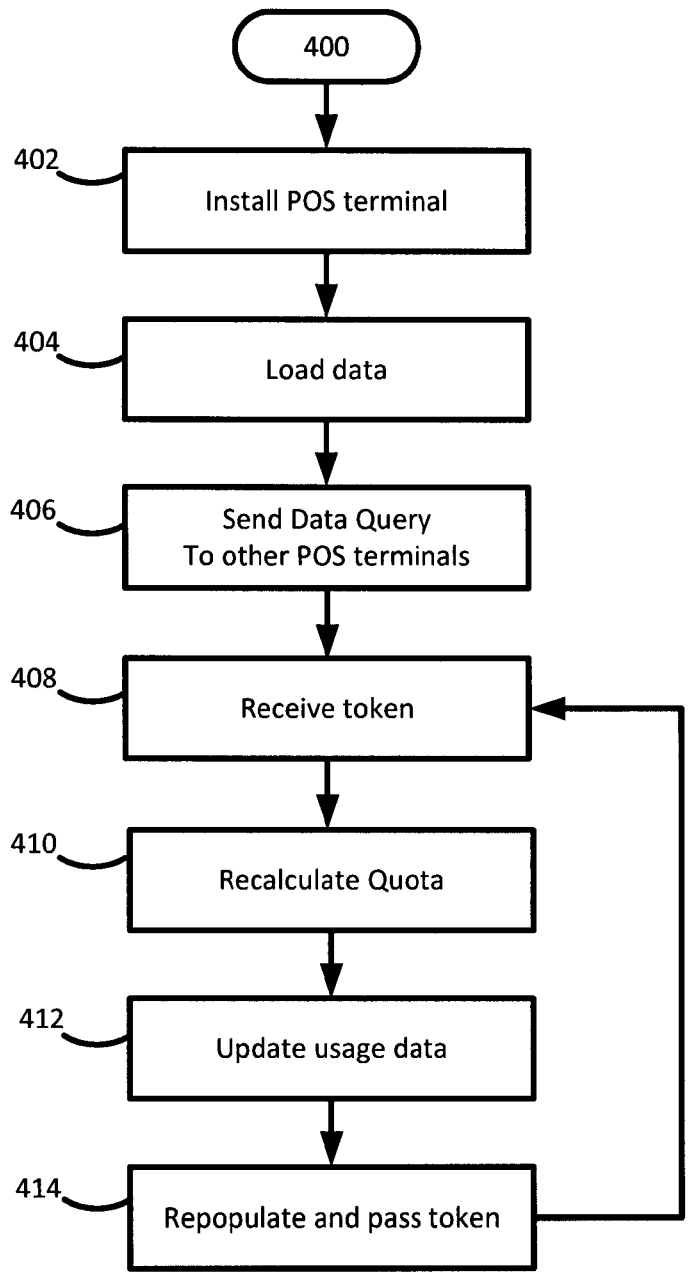
FIG. 4 is a flowchart illustrating a process for managing inventory in a POS terminal.

A basic process 400 for operating a POS terminal 105 is illustrated in FIG. 4. Steps 402 through 406 are typically for initial installation or reboot of the POS terminal 105, while ordinary operation of the POS terminal is described in steps 408-414.

In step 402, a server is installed and initially configured with an application program as a generic POS terminal, and a communication program to enable communication with the other POS terminals in the system via a communications bus. In step 404, the server is customized by loading it with an initial data set that includes the specific identity and location for this POS terminal, all relevant schedules and related booking information for event reservations, and data regarding the specific identity and location of all other POS terminals in the system. Relevant schedule and booking information includes key data such as flight numbers, departure dates and times, reservation capacity, seating category, etc.

Once the POS terminal is booted and online, that is, coupled to the communications bus, the server initiates a bus cycle by sending a Data Query to the communication bus in step 406. A Data Query is a token set to a "data only" mode such that the data fields that would normally contain a usage update for this POS terminal will be ignored by other POS terminals during the cycle so that only the current inventory status data from the other POS terminals is collected.

The token circulates in a defined order among the other POS terminals of the system (and thus the ring analogy), collects inventory status updates, and finally returns to the original server in step 408 with updated information about quotas and inventories for all POS terminals. Based on the updated information, the server calculates its quotas in step 410, then updates its inventory_data record 320 in step 412. The server can then update the token and pass it back to the communications bus in step 414 to provide its status updates to the other POS devices. Steps 405 through 414 are repeated each time the updated token is returned to the POS terminal.

The calculation of quotas in step 414 is done in accord with programmed instructions that are loaded into the server in step 404, using data that is collected (i) from other POS terminals regarding their usage and inventory allocations in step 408, (ii) from its own inventory allocations calculation in step 410, and (iii) from its own usage data in step 412. Of course, sometimes data updates may not be available from other POS terminals for a period of time, and the programmed instructions may apply formulations and/or booking policies based on the most recent data stored in the hash table.

Specific formulations for the calculation of reservation inventory allocations can be derived based on a number of event-specific factors, including expected or historical demand for reservations, and timing of related promotional or marketing activities, but may also incorporate general reservation booking policies. For example, any inventory allocation must take into account the fact that last-minute reservations (e.g., during some defined time period before departure such as 24 hours) are usually only available for purchase through the POS terminal at the location of origin for the event, such as the departure airport or gate for a particular flight. In that sense, the POS terminal at the location of origin for an event or departure is considered the "owner" of the inventory for that event, and all inventory will revert to that POS terminal during the last-minute period of sales.

The allocation of reservation inventory to a specific POS terminal for a specific event is called a quota Q1 herein. However, because of the complexity of the reservation process, it would be very difficult to specify a single formulation of Q1 for every type of event that may have reservations available for sale through the distributed reservation system described herein.

In general, however, an effective formulation of quota Q1 to set or update an allocation of event reservation inventory for a particular POS terminal will preferably take into account one or more factors of the overall reservation system inventory data, including (i) the total event capacity for reservations, (ii) the current usage rate (sales) and quotas Q2 for other POS terminals, and (iii) the current usage rate and quota Q1 for this particular POS terminal.

For example, a simple formulation for the initial quota Q1 for a particular POS terminal may be set by taking the total reservation capacity N for an event and subtracting the sum Q2 of all quotas allocated to other POS terminals, namely:

$$Q1=(N-Q2) \tag{1}$$

However, it is preferred that calculation or recalculation of quotas should consider all inventory status values from the data packet in order to optimize the allocations among all POS terminals. In another one-dimensional example, the quota Q1 for a particular POS terminal can be set as a function of all the inventory data stored in the hash table, and periodically updated via the token. As one example:

$$Q1 = A1 + [f1(N-A1-A2)/(f1+f2)] \quad (2)$$

where f1 is the demand, i.e., expected flow of inventory requests for this POS terminal; f2 is the last known demand for inventory requests for all other POS terminal; N is the reservation capacity for the event (known through setup); Q2 is the sum of quotas for all other POS terminals; A1 is the current usage, i.e., sold inventory of this POS; and A2 is the last known usage of all other POS terminals. All of this data can be maintained and readily retrieved from a single record in the POS terminal, such as record 320 in FIG. 3.

Equation (2) is only one of many possible relationships that can be defined by using the inventory data. In Equation (3), the quota Q1 can be defined as the minimum of the result of either Equation (1) or Equation (2), namely:

$$Q1 = \min\{A1 + [f1(N-A1-A2)/(f1+f2)], N-Q2\} \quad (3)$$

Thus, instead of relying on a central reservation server to manage inventory, each POS terminal in the distributed system 100 manages its own inventory. The process of managing inventory is improved by having each POS terminal communicate directly with the other POS terminals in order to share inventory status updates.

In one embodiment, a computer program product has instructions for managing and allocating inventory encoded on a machine-readable storage medium, which can be used to program a computer to perform any of the processes of the embodiments described herein. Computer code for operating and configuring the system to intercommunicate and to process data as described herein are preferably downloaded and stored on a hard disk of the computer, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used.

While one or more implementations have been described by way of example and in terms of the specific embodiments, it is to be understood that the disclosed embodiments are not intended to be limiting. To the contrary, this disclosure is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for managing an inventory of event reservations in a computer-based reservation system, comprising:

configuring each of a plurality of POS terminals as a stand-alone computing device, each POS terminal installed at a different physical location and coupled to a communications bus, each POS terminal identified by a unique address on the communications bus, each POS terminal initialized with data and instructions including event data for a plurality of events, inventory data including at least a total inventory of available reservations for each event, and inventory allocation programming instructions for determining an allocation of available reservation inventory for each event for the POS terminal, as well as the unique address of the POS terminal, the unique addresses of all other POS terminals, a defined order of the unique addresses for circulating a data packet among the plurality of POS terminals, and a next POS terminal in the defined order;

periodically circulating the data packet in the defined order on the communications bus to each of the plurality of POS terminals, the data packet having a header including a source address and a destination address, wherein at each POS terminal, the POS terminal transmits to the data packet updated inventory status data of the POS terminal and receives from the data packet updated inventory status data for each of the other POS terminals, the updated inventory status data for each POS terminal including current reservation inventory allocations for each event for the POS terminal, current rate of reservation inventory usage for each event for the POS terminal, and projected reservation inventory demand for each event for the POS terminal, the POS terminal also updating the header after receiving and transmitting updated inventory status data to identify the POS terminal as the source address and the next POS terminal in the defined order as the destination address;

determining, at each POS terminal, using the inventory allocation programming instructions, an updated allocation of reservation inventory for each event for the POS terminal as a function of the total inventory of available reservations for each event and the updated inventory status data for each event for the POS terminal and for each of the other POS terminals; and operating each of the POS terminals independently to sell their respective allocation of reservation inventory for each event.

2. The method of claim 1, the configuration step further including each POS terminal having program instructions for communicating with the data packet;

the method further comprising, at each POS terminal:
receiving the data packet from the communications bus;
storing the inventory status data for the other POS terminals;
updating the determination of the allocation of reservation inventory for the POS terminal;
updating the data packet to include the inventory status data for the POS terminal, the inventory status data including current inventory allocations, current rate of inventory usage, and projected inventory demand for each event for the POS computing device; and sending the updated data packet onto the communications bus.

3. The method of claim 2, further comprising:
periodically updating the determination of the allocation of inventory for the POS terminal.

4. The method of claim 1, wherein the determining step further comprises:
performing the step of determining a current allocation to incorporate at least one factor of a reservation booking policy.

5. A non-transitory computer-readable storage medium encoded with executable instructions for managing an inventory of event reservations in a computer-based reservation system, the instructions comprising:
configuring each of a plurality of POS terminals as a stand-alone computing device, each POS terminal installed at a different physical location and coupled to a communications bus, each POS terminal identified by a unique address on the communications bus, each POS terminal initialized with data and instructions including event data for a plurality of events, inventory data including at least a total inventory of available reservations for each event, and inventory allocation programming instructions for determining an allocation of available reservation inventory for each event for the POS terminal, as well as the unique address of the POS terminal, the unique addresses of all other POS terminals, a defined order of the unique addresses for circulating a data packet among the plurality of POS terminals, and a next POS terminal in the defined order;
periodically circulating the data packet in the defined order on the communications bus to each of the plurality of POS terminals, the data packet having a header including a source address and a destination address, wherein at each POS terminal, the POS terminal transmits to the data packet updated inventory status data of the POS terminal and receives from the data packet updated inventory status data for each of the other POS terminals, the updated inventory status data for each POS terminal including current reservation inventory allocations for each event for the POS terminal, current rate of reservation inventory usage for each event for the POS terminal, and projected reservation inventory demand for each event for the POS terminal, the POS terminal also updating the header after receiving and transmitting updated inventory status data to identify the POS terminal as the source address and the next POS terminal in the defined order as the destination address;
determining, at each POS terminal, using the inventory allocation programming instructions, an updated allocation of reservation inventory for each event for the POS terminal as a function of the total inventory of available reservations for each event and the updated inventory status data for each event for the POS terminal and for each of the other POS terminals; and
operating each POS terminal independently to offer for sale the current allocation of reservation inventory for each event.

6. The non-transitory computer-readable storage medium of claim 5, the instructions further comprising each POS terminal configured for:
receiving the data packet from the communications bus coupled to each of the POS terminals;
storing the status data contained in the data packet;
updating the determination of the current allocation of reservation inventory for the POS terminal;
updating the data packet to include the status data for the POS terminal, the status data for the POS terminal including current inventory allocations, current rate of inventory usage, and projected inventory demand for each event for the POS terminal; and
sending the updated data packet onto the communications bus.

7. The non-transitory computer-readable storage medium of claim 6, the instructions further comprising:
periodically updating the determination of the current allocation of inventory for the POS terminal.

8. The non-transitory computer-readable storage medium of claim 5, the instructions further comprising:
performing the step of determining a current allocation to incorporate at least one factor of a reservation booking policy.

9. A computer-based reservation system having a method for managing an inventory of event reservations, comprising:
a processor-based server installed as a first POS computing device; and
one or more stored sequences of instructions which, when executed by the server, cause the server to carry out the steps of:
configuring each of a plurality of POS terminals as a stand-alone computing device, each POS terminal installed at a different physical location and coupled to a communications bus, each POS terminal identified by a unique address on the communications bus, each POS terminal initialized with data and instructions including event data for a plurality of events, inventory data including at least a total inventory of available reservations for each event, and inventory allocation programming instructions for determining an allocation of available reservation inventory for each event for the POS terminal, as well as the unique address of the POS terminal, the unique addresses of all other POS terminals, a defined order of the unique addresses for circulating a data packet among the plurality of POS terminals, and a next POS terminal in the defined order;
periodically circulating the data packet in the defined order on the communications bus to each of the plurality of POS terminals, the data packet having a header including a source address and a destination address, wherein at each POS terminal, the POS terminal transmits to the data packet updated inventory status data of the POS terminal and receives from the data packet updated inventory status data for each of the other POS terminals, the updated inventory status data for each POS terminal including current reservation inventory allocations for each event for the POS terminal, current rate of reservation inventory usage for each event for the POS terminal, and projected reservation inventory demand for each event for the POS terminal, the POS terminal also updating the header after receiving and transmitting updated inventory status data to identify the POS terminal as the source address and the next POS terminal in the defined order as the destination address;
determining, at each POS terminal, using the inventory allocation programming instructions, an updated allocation of reservation inventory for each event for the POS terminal as a function of the total inventory of available reservations for each event and the updated inventory status data for each event for the POS terminal and for each of the other POS terminals; and operating each POS terminal independently to offer for sale the current allocation of reservation inventory for each event.

10. The method of claim 1, further comprising providing network access for other computing devices to at least some of the POS terminals.

\* \* \* \* \*